(12) United States Patent
Murata et al.

(10) Patent No.: US 8,514,461 B2
(45) Date of Patent: Aug. 20, 2013

(54) IMAGE PROCESSING APPARATUS, COMPUTER READABLE STORAGE MEDIUM STORING POWER SUPPLY CONTROL PROGRAM

(75) Inventors: Yuji Murata, Kanagawa (JP); Masafumi Ono, Kanagawa (JP); Mitsunobu Mamiya, Kanagawa (JP); Noriyuki Obara, Kanagawa (JP); Hidenori Itoh, Kanagawa (JP); Ken Naoe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 382 days.

(21) Appl. No.: 12/946,563

(22) Filed: Nov. 15, 2010

(65) Prior Publication Data

US 2011/0299131 A1 Dec. 8, 2011

(30) Foreign Application Priority Data

Jun. 7, 2010 (JP) ................. 2010-130065

(51) Int. Cl.
*H04N 1/40* (2006.01)
*H04N 1/36* (2006.01)

(52) U.S. Cl.
USPC .......................... 358/448; 358/422

(58) Field of Classification Search
USPC .................. 358/448, 1.9, 1.14, 437
See application file for complete search history.

(56) References Cited

U.S. PATENT DOCUMENTS 7,639,963 B2 * 12/2009 Matsuo .................... 399/88
2008/0266588 A1 10/2008 Inaba

FOREIGN PATENT DOCUMENTS

| JP | 2004-200995 A | 7/2004 |
| JP | 2004-266661 A | 9/2004 |
| JP | 2008-160524 A | 7/2008 |

* cited by examiner

*Primary Examiner* — Douglas Tran
(74) *Attorney, Agent, or Firm* — Sughrue Mion, PLLC

(57) ABSTRACT

There is provided an image processing apparatus including: an image scanner that scans in an image of an original, the image scanner including an opening and closing member capable of moving between an open position and a closed position, a closing operation detection unit that detects closing operation of the opening and closing member, and a determination unit that determines a size and orientation of the original; an image forming unit that forms an image on recording paper based on scanned image data; a switching unit that independently switches between power supply or supply interruption for the image scanner and the image forming unit; and a notification unit that, after power supply has been resumed to the image scanner, executes notification to urge selection of either manual input of the size and the orientation of the original or opening and closing operation of the opening and closing member.

4 Claims, 6 Drawing Sheets

IMAGE PROCESSING APPARATUS, COMPUTER READABLE STORAGE MEDIUM STORING POWER SUPPLY CONTROL PROGRAM

CROSS-REFERENCE TO RELATED APPLICATION

This application is based on and claims priority under 35 USC 119 from Japanese Patent Application No. 2010-130065 filed on Jun. 7, 2010.

BACKGROUND

1. Technical Field

The present invention relates to an image processing apparatus and to a computer readable storage medium stored with a power supply control program.

2. Related Art

There is a conventional technology in which power is independently supplied to functional units of an image processing apparatus.

SUMMARY

An image processing apparatus according to an aspect of the present invention includes: an image scanner that executes image processing to scan in an image of an original when there has been an image scanning instruction, the image scanner including an original platen on which the original is placed, an opening and closing member capable of moving between two positions that are an open position for placing an original on the original platen, and a closed position in which the original is disposed between the original platen and the opening and closing member, a closing operation detection unit that detects closing operation of the opening and closing member from the open position to the closed position, and a determination unit that determines a size and orientation of the original placed on the original platen when closing operation has been detected by the closing operation detection unit; an image forming unit that forms an image on recording paper based on either image data scanned by the image scanner or image data received from outside of the image scanner; a switching unit that independently switches between power supply or supply interruption for a plural respective image processors at least including the image scanner and the image forming unit; a notification unit that, when there has been a power save release instruction with the image scanner in a power interrupted state, after power supply has been resumed the notification unit executes notification to urge selection of either manual input of the size and the orientation of the original or opening and closing operation of the opening and closing member; and an image scanning processing control unit that executes image scanning processing of the image scanner at time when the size and the orientation of the original have been confirmed based on operation according to notification of the notification unit.

BRIEF DESCRIPTION OF THE DRAWINGS

An exemplary embodiment of the present invention will be described in detail based on the following figures, wherein.

DETAILED DESCRIPTION

Figure 1:
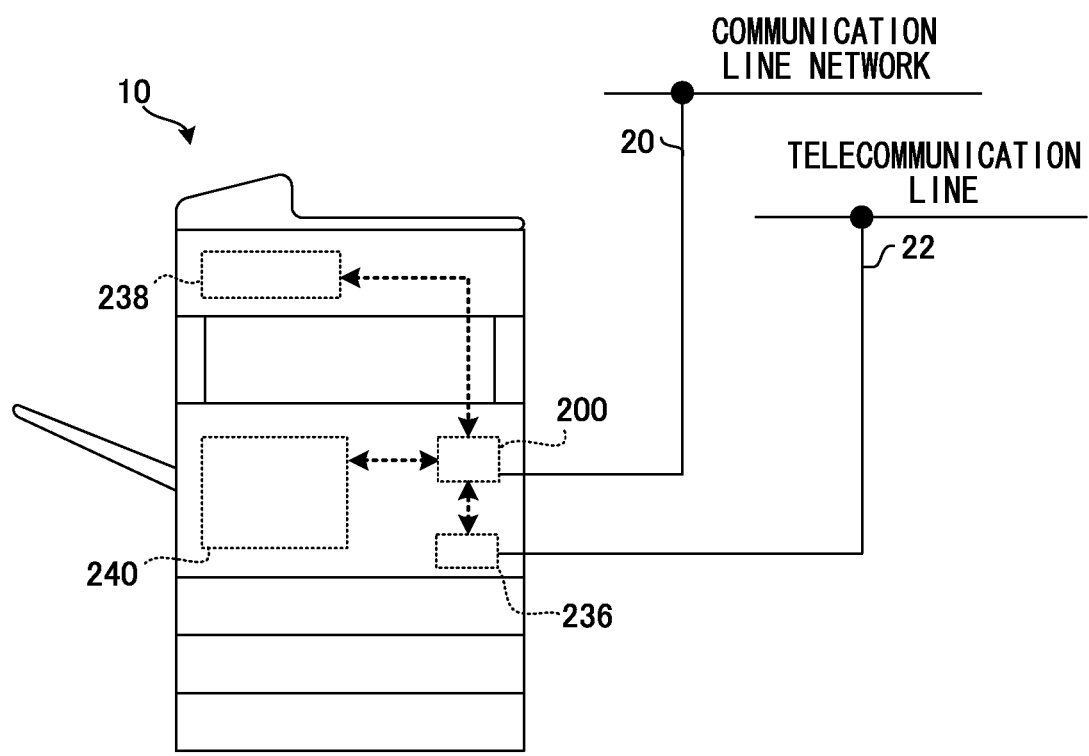
FIG. 1 is a schematic diagram of an image processing apparatus according to a present exemplary embodiment.

An image processing apparatus 10 according to a present exemplary embodiment is shown in FIG. 1. The image processing apparatus 10 includes an image forming section 240 that forms an image on recording paper, an image scanning section 238 that scans an original image, and a facsimile communication control circuit 236. The image processing apparatus 10 includes a main controller 200 that controls the image forming section 240, the image scanning section 238 and the facsimile communication control circuit 236, temporarily stores image data of an original image scanned by the image scanning section 238, and transmits scanned image data to the image forming section 240 or the facsimile communication control circuit 236.

A communication line network 20, such as, for example, the Internet, is connected to the main controller 200, and a telecommunication line network 22 is connected to the facsimile communication control circuit 236. The main controller 200 is, for example, connected through the communication line network 20 to a host computer. The main controller 200 receives image data and executes facsimile reception and facsimile transmission through the facsimile communication control circuit 236 using the telecommunication line network 22.

The image forming section 240 includes a photoreceptor and is provided around the periphery of the photoreceptor with a charging device for uniformly charging the photoreceptor, a scanning light exposing section that scans a light beam based on image data, an image developing section that develops an electrostatic latent image formed by scanning exposure with the scanning light exposing section, a transfer section that transfers a developed image on the photoreceptor onto the recording paper, and a cleaning section that cleans the surface of the photoreceptor after transfer. The image forming section 240 also includes a fixing section disposed on the conveying path of the recording paper for fixing images onto the recording paper after transfer.

The image scanning section 238 includes an original platen for positioning the original, a scanning driving system that scans and illuminates light onto the image of the original placed on the original platen, and a photoelectric converter element, such as, for example, a CDD or the like, that receives light reflected and transmitted by scanning with the scanning driving system and converts the received light into an electrical signal.

Figure 2:
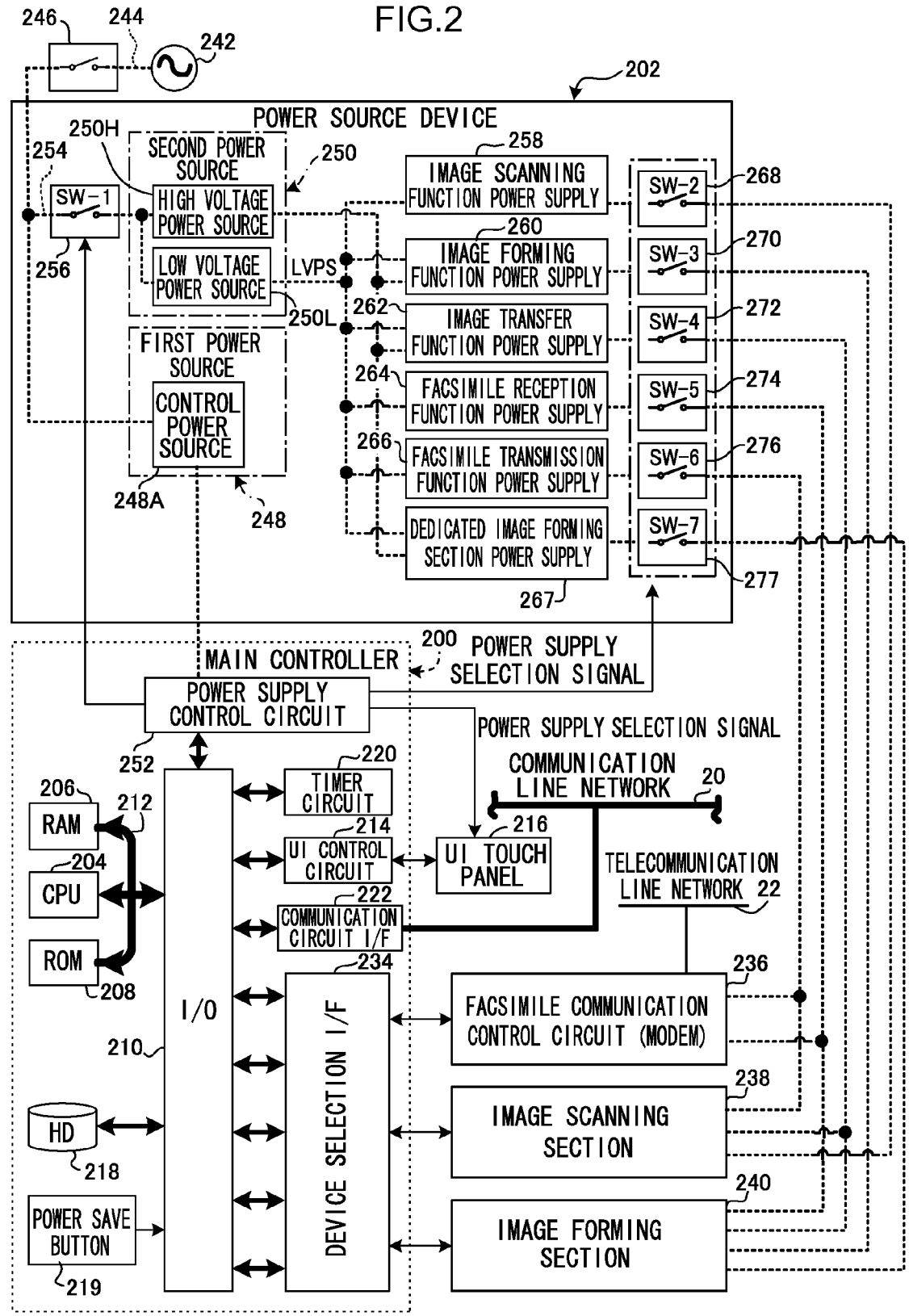
FIG. 2 is a schematic configuration diagram of a main controller and a power source device according to the present exemplary embodiment.

FIG. 2 is a schematic configuration diagram mainly focused on the devices controlled by the main controller 200 and the power source lines of a power source device 202 for supplying power to the main controller 200 and each of the devices.

Main Controller 200

As shown in FIG. 2, the main controller 200 includes a CPU 204, RAM 206, ROM 208, an input-output (I/O) section 210, and a bus 212, such as a data bus, control bus or the like, connecting together these components. A UI touch panel 216 is connected to the I/O section 210 through a UI control circuit 214. A Hard Disk Drive (HDD) 218 and power save button 219 are connected to the I/O section 210. The functionality of the main controller 200 is executed by operation of the CPU 204 according to program(s) stored on, for example, the ROM 208, the HDD 218 or the like. Note that configuration may be made in which such a program(s) is/are stored on a storage medium (CD-ROM, DVD-ROM or the like) then installed therefrom, with the image processing function executed by operation of the CPU 204 according to the installed program.

The power save button 219 is a so-called hard switch (physically operated switch), such that power save and power save release are alternately instructed to the apparatus for each press operation. Further explanation relating to power save is given below.

The main controller 200 of the present exemplary embodiment instructs the devices it is connected to with three types of mode, these being standby mode, a power save mode and a sleep mode. The standby mode is a power supplied state, and sleep mode is a power interrupted state. The power save mode is a mode instructing to power some of the devices that require power in order to truncate the duration from reception of a job to execution start.

The main controller 200 instructs one or other of the three types of mode, however sometimes transition is made to the sleep mode or the standby mode in response to a power save mode instruction for devices without a power save mode.

A timer circuit 220 and a communication circuit I/F 222 are connected to the I/O section 210. A device selection I/F 234 is also connected to the I/O section 210.

The device selection I/F 234 is connected to each of devices of the facsimile communication control circuit (modem) 236, the image scanning section 238 and the image forming section 240. The UI touch panel 216 is sometimes recognized as a device.

Note that the timer circuit 220 performs timing of the initial setting duration, as the trigger for setting the power save state (power non-supply state) of the facsimile communication control circuit 236, the image scanning section 238, the image forming section 240, and the UI touch panel 216.

The main controller 200 and each device (the facsimile communication control circuit 236, the image scanning section 238, and the image forming section 240) are supplied with power from the power source device 202 (see the broken lines in FIG. 2). Note that while power lines of a single strand are shown by broken lines in FIG. 2, in reality they are actually configured with 2 or 2 strands of wiring. While not shown in the figures, the UI touch panel 216 receives power from a power supply separate to that of the main controller 200, so as to receive control for power supply and interruption from a power supply control circuit 252.

Power Source Device 202

As shown in FIG. 2, an input power source line 244 that leads out from a commercial power source 242 is connected to a main switch 246. Power supply to a first power source section 248 and a second power source section 250 is enabled by the main switch 246 being in the ON state.

The first power source section 248 includes a control power source 248A and is connected to a power supply control circuit 252 of the main controller 200. The power supply control circuit 252 supplies power to the main controller 200, performs switching control for transmitting/interrupting transmission along power supply lines to each of the devices (the facsimile communication control circuit 236, the image scanning section 238, the image forming section 240 and the UI touch panel 216) according to a control program of the main controller 200.

A first sub-power source switch 256 is inserted in a power source line 254 connecting to the second power source section 250 (sometimes referred to below as "SW-1"). The SW-1 is ON-OFF controlled by the power supply control circuit 252.

The second power source section 250 includes a high voltage power source (mainly employed as a heater power source used in the fixing section of the image forming section 240) 250H, and a low voltage power source (LVPS) 250L. The high voltage power source 250H is a power source mainly employed for the charging section, the developing section, the transfer section and the like of the image forming section 240.

The high voltage power source 250H and the low voltage power source (LVPS) 250L of the second power source section 250 are selectively connected to an image scanning function power supply 258, an image forming function power supply 260, an image transfer function power supply 262, a facsimile reception function power supply 264, and a facsimile transmission function power supply 266.

In the present exemplary embodiment, in addition to the above functionally separate power supply system, a dedicated image forming section power supply 267 is also connected to the high voltage power source 250H and the low voltage power source (LVPS) 250L of the second power source section 250.

In the image forming section 240, in temperature management of the fixing section, there are occasions in which a temperature is maintained that is lower than the temperature during the standby mode enabled for immediate image forming processing execution, this being a temperature capable of comparatively rapid raising of temperature to the temperature at which image forming processing is enabled (in the power save mode).

Accordingly, the image forming section 240 during power saving the power supply thereto is interrupted, as a sleep mode, to suppress power consumption. In the image forming section 240, the power save mode state is temporarily held during a period before entering the sleep mode, and the dedicated image forming section power supply 267 is provided for subsequently transitioning to the sleep mode.

The image scanning function power supply 258 is connected to the image scanning section 238 via a second sub-power source switch 268 (sometimes referred to below as "SW-2") for inputting as a power source the low voltage power source (LVPS) 250L.

The image forming function power supply 260 is connected, as input power source of the high voltage power source 250H and the low voltage power source (LVPS) 250L, to the image forming section 240 via a third sub-power source switch 270 (sometimes referred to below as "SW-3").

The image transfer function power supply 262 is connected, as input power source of the high voltage power source 250H and the low voltage power source (LVPS) 250L, to the image scanning section 238 and the image forming section 240 via a fourth sub-power source switch 272 (sometimes referred to below as "SW-4").

The facsimile reception function power supply 264 is connected, as input power source of the high voltage power source 250H and the low voltage power source (LVPS) 250L, to the facsimile communication control circuit 236 and the image forming section 240 via a fifth sub-power source switch 274 (sometimes referred to below as "SW-5").

The facsimile transmission function power supply 266 is (except for in output of communication reports and the like) connected, as input power source of the low voltage power source (LVPS) 250L, to the facsimile communication control circuit 236 and the image scanning section 238 via a sixth sub-power source switch 276 (sometimes referred to below as "SW-6").

The dedicated image forming section power supply 267 is connected, as input power source of the high voltage power source 250H and the low voltage power source (LVPS) 250L, to the image forming section 240 via a seventh sub-power source switch 277 (sometimes referred to below as "SW-7").

The second sub-power source switch 268, the third sub-power source switch 270, the fourth sub-power source switch 272, the fifth sub-power source switch 274, the sixth sub-power source switch 276, and the seventh sub-power source switch 277 are, in a similar manner to the first sub-power source switch 256, respectively ON-OFF controlled based on power supply selection signals from the power supply control circuit 252 of the main controller 200.

In the above configuration, due to functionally separate supply of the selected power supply to each of the devices (the facsimile communication control circuit 236, the image scanning section 238, and the image forming section 240), only the minimum amount of power is used since power is not supplied to devices of functions not instructed.

In the present exemplary embodiment, the main controller 200ON-OFF controls the SW-1 to SW-7 switches using the power supply control circuit 252, selects the devices according to each of the processing functions, supplies power at only the minimum number of devices (standby mode). As well as this, in the present exemplary embodiment there is also capability for interrupting power supply to devices not required (sleep mode), so-called "partial power save".

For example, the image forming section 240 is not utilized in the image scanning function and the facsimile transmission function (except for in the output of communication report and the like). Accordingly, from the perspective of "partial power save", the image forming section 240 is a device to which power supply could be interrupted. However, the image forming section 240 includes the fixing section requiring temperature control of a heating medium (such as, for example a halogen lamp, heater or the like), and the ability to control the temperature would be completely lost were power supply to be interrupted. Therefore, configuration is made such that the temperature of the heating medium of the fixing section in the image forming section 240 is maintained in a "low power" state (power save mode), a lower temperature to that during standby mode.

Configuration is made such that when each of the devices has entered the power save state and a processing function is instructed by operation of the power save button 219, operation of the UI touch panel or hard key, or when a remote job is received (including printing and facsimile), the devices required for that particular processing function are selected and reactivated from the partial power save state. In other words, devices that are not required for execution of that particular processing function are maintained in the power save state.

However, in the image scanning section 238, there are two types of mounting modes for when an original is scanned. Namely, as shown in FIG. 3, there is: a scanning mode in which an opening and closing member 24 attached to the top face of the image scanning section 238 is opened, originals are placed one sheet at a time on a transparent plate shaped (for example glass plate) original platen 26 and the opening and closing member 24 is closed (referred to below as "platen scanning"); and a scanning mode in which plural sheets of original are placed in a bundled state on a reception tray 28A of an automatic feeding mechanism 28 provided to the opening and closing member 24, and the originals are fed out automatically one sheet at a time (referred to below as "DADF scanning").

For DADF scanning, there is an original detection sensor (not shown in the figures) provided at the position where the bundle of originals are placed. The image scanning section 238 that is in power save mode is restored (to the power supplied state) on detecting originals using the original detection sensor. In addition, in order to feed the originals, the size and orientation of the originals is determined during the feeding operation. Consequently, with regard to the DADF scanning, configuration is made such that the image scanning section 238 in power save mode is capable of being reactivated from the power save mode simply by placing the originals, without any particular prior operation to instruct a processing function.

For platen scanning, configuration is made such that when the image scanning section 238 is in the normal state (power supplied state), closing operation of the opening and closing member 24 is detected, and the size and orientation of the original is identified.

Figure 3:
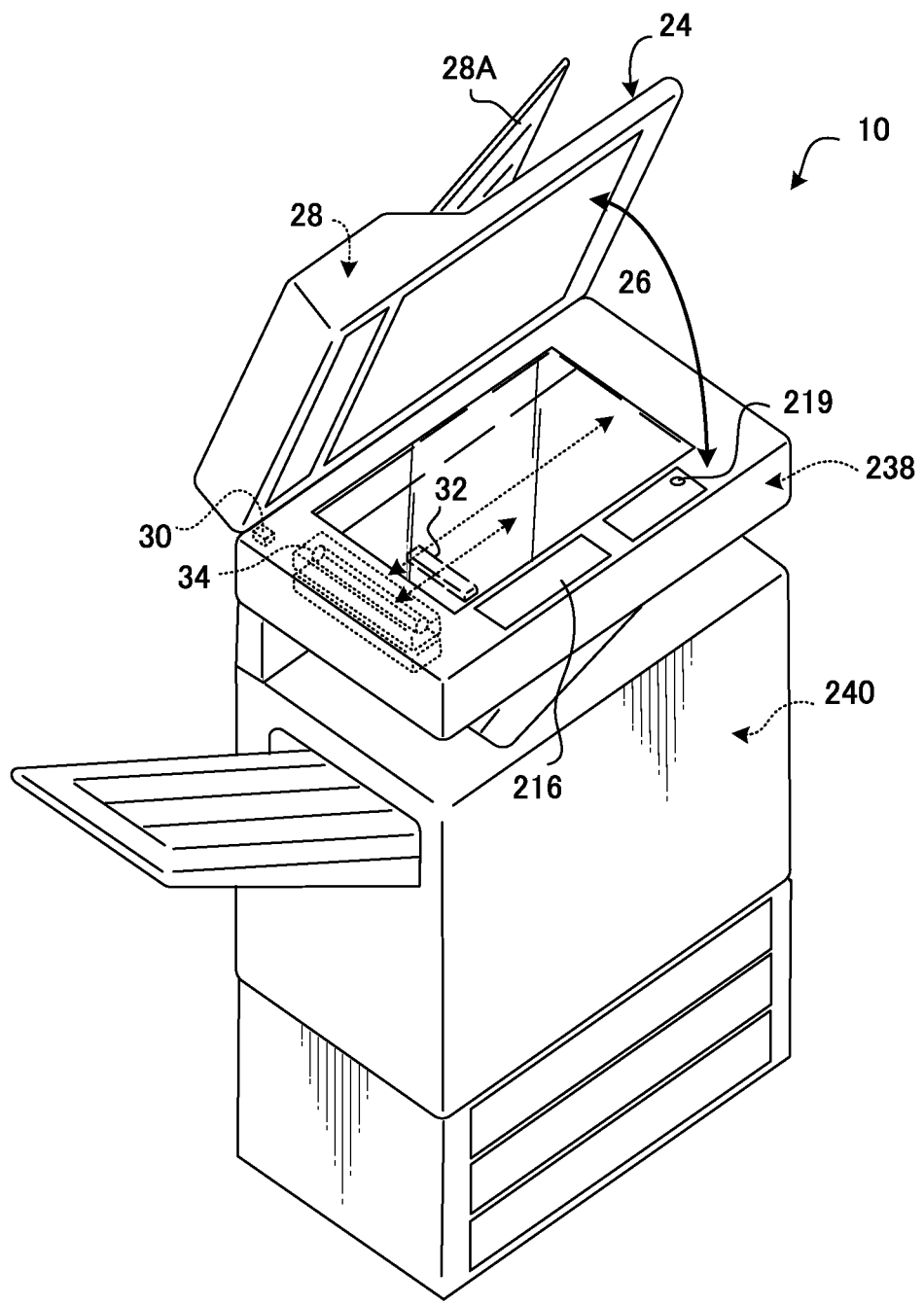
FIG. 3 is a perspective view of an image processing apparatus according to the present exemplary embodiment.

Namely, as shown in FIG. 3, an opening and closing operation sensor 30 is provided to the image scanning section 238 to detect opening and closing operations of the opening and closing member 24. A scanning mechanism 33 is provided in the space below the original platen 26. A light source section 34 and an optical system, not shown in the figures, are incorporated in the scanning mechanism 33. A CCD line sensor 32 is provided in a lower portion of the space below the original platen 26.

In image scanning operation, by the scanning mechanism 33 moving in the broken line arrow direction of FIG. 3, the surface of an original placed on the original platen 26 is scanned, and light that has been guided by scanning (original reflected light) is detected by the CCD line sensor 32.

Configuration is also made such that when the opening and closing member 24 is opened, and closing operation of the opening and closing member 24 is detected after the original has been placed on the original platen 26, the size and orientation of the original is detected using the image scanning mechanism.

Namely, when closing operation of the opening and closing member 24 is detected, the light source section 34 is illuminated, and light is detected with the CCD line sensor 32. Due to the light source section 34 being illuminated in a state in which the opening and closing member 24 is not completely closed, there is a great difference between the detected densities in the regions where the original is present and the regions where the original is not present, and the size and orientation of the original is detectable by the detection state of the CCD line sensor 32.

Note that configuration may be made such that plural original edge detection sensors are disposed at appropriate positions around the peripheral edge of the original platen 26 in order to detect the size and orientation of the original.

The opening and closing operation sensor 30, the CCD line sensor 32, the light source section 34 and the like obviously do not function when the image scanning section 238 is in the power save mode.

Accordingly, there is no reaction even when an original is placed on the original platen 26 and the opening and closing member 24 is closed. In order to address this, in the present exemplary embodiment, after an original has been placed and the opening and closing member 24 closed, when operation is undertaken to reactivate from power save (by operation of the power save button 219, or selection of a processing function including the image scanning function), configuration is made such that after reactivation processing, a screen is displayed on the UI touch panel 216 for indicating the size and orientation of the original, and at the same time a message instructing opening and closing operation of the opening and closing member 24 is displayed (such as, for example, "first open then slowly close the lid of the original platen").

Figure 4:
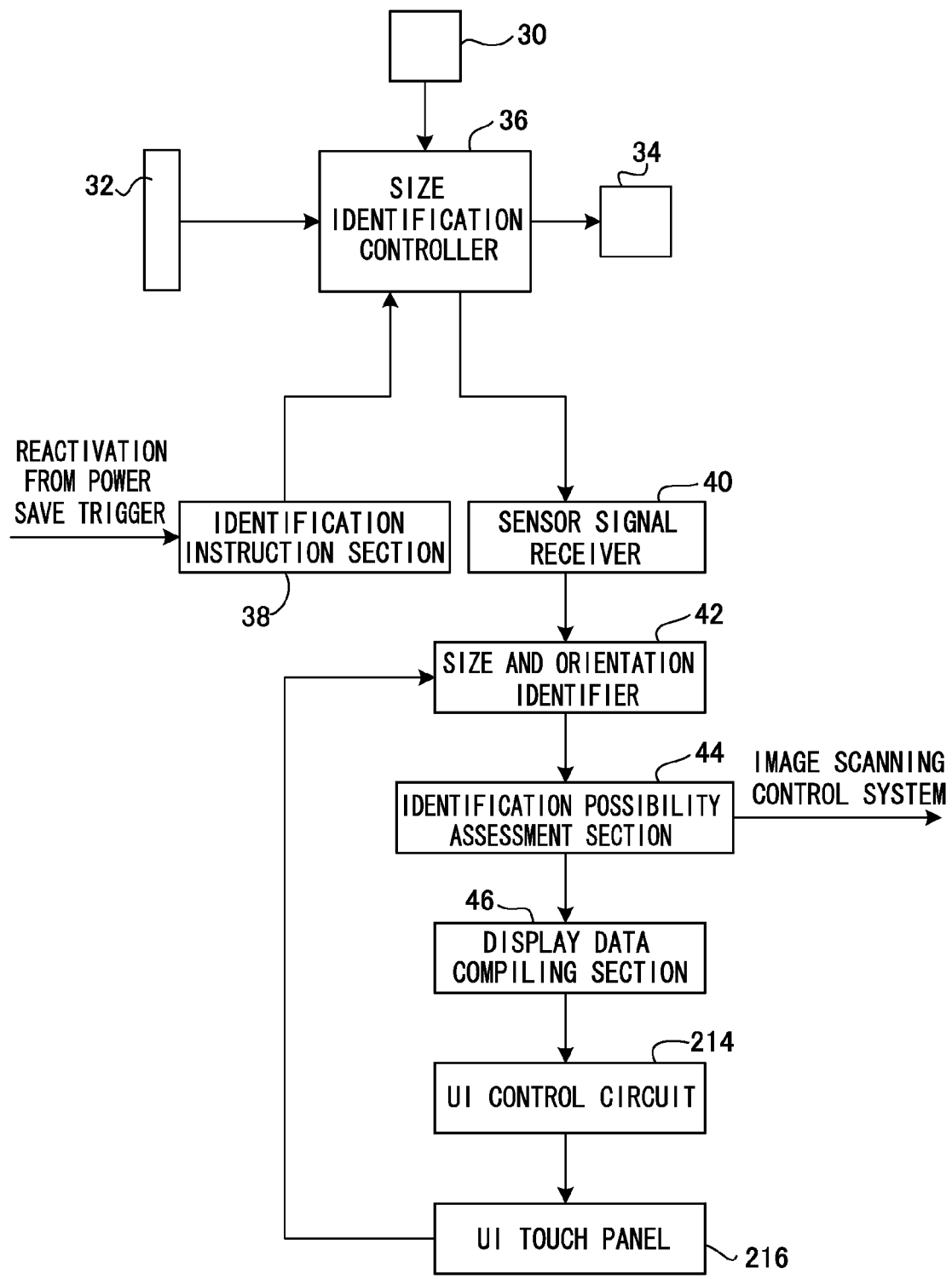
FIG. 4 is a block diagram of functions for identifying the size and orientation of an original that has been placed on an original platen of an image scanning section according to the present exemplary embodiment.

FIG. 4 is a block diagram in which control for identifying the size and orientation of the original when reactivating from the power save mode is functionally shown.

A size identification control section 36 is provided in the image scanning section 238, connected to the opening and closing operation sensor 30, the CCD line sensor 32 and the light source section 34. Note that while not shown in the figures, the CCD line sensor 32 and the light source section 34 are also connected to an image scanning control system.

An identification instruction section 38 of the main controller 200 is connected to the size identification control section 36. When reactivation from power save is triggered, the identification instruction section 38 instructs the image scanning section 238 to identify the size and orientation of the original. In response to such instruction the size identification control section 36 performs size identification operation.

Size identification operation refers to detecting closing operation of the opening and closing member 24, illuminating the light source section 34, and detecting edge portions of the original using the CCD line sensor 32.

A sensor signal reception section 40 is connected to a portion of the size identification control section 36 and receives a signal from the CCD line sensor 32.

The sensor signal receiver 40 is connected to a size and orientation identifier 42, and the size and orientation is identified in the size and orientation identifier 42 based on the signal of the CCD line sensor 32.

The identification result of the size and orientation identifier 42 is transmitted to an identification possibility assessment section 44. The identification possibility assessment section 44 is configured to assess whether or not the size and orientation of the original can be identified.

When determined in the identification possibility assessment section 44 that the size and orientation of the original can be identified, data of the size and orientation of this original is transmitted to the image scanning control system.

However, when the size and orientation of the original cannot be identified in the identification possibility assessment section 44, identification not-possible data is transmitted to a display data compiling section 46.

The display data compiling section 46 compiles screen data for indicating the size and orientation of the original and message data instructing opening and closing operation of the opening and closing member 24 (for example, "first open then slowly close the lid of the original platen"), for display via the UI control circuit 214 on a display screen of the UI touch panel 216.

Figure 5:
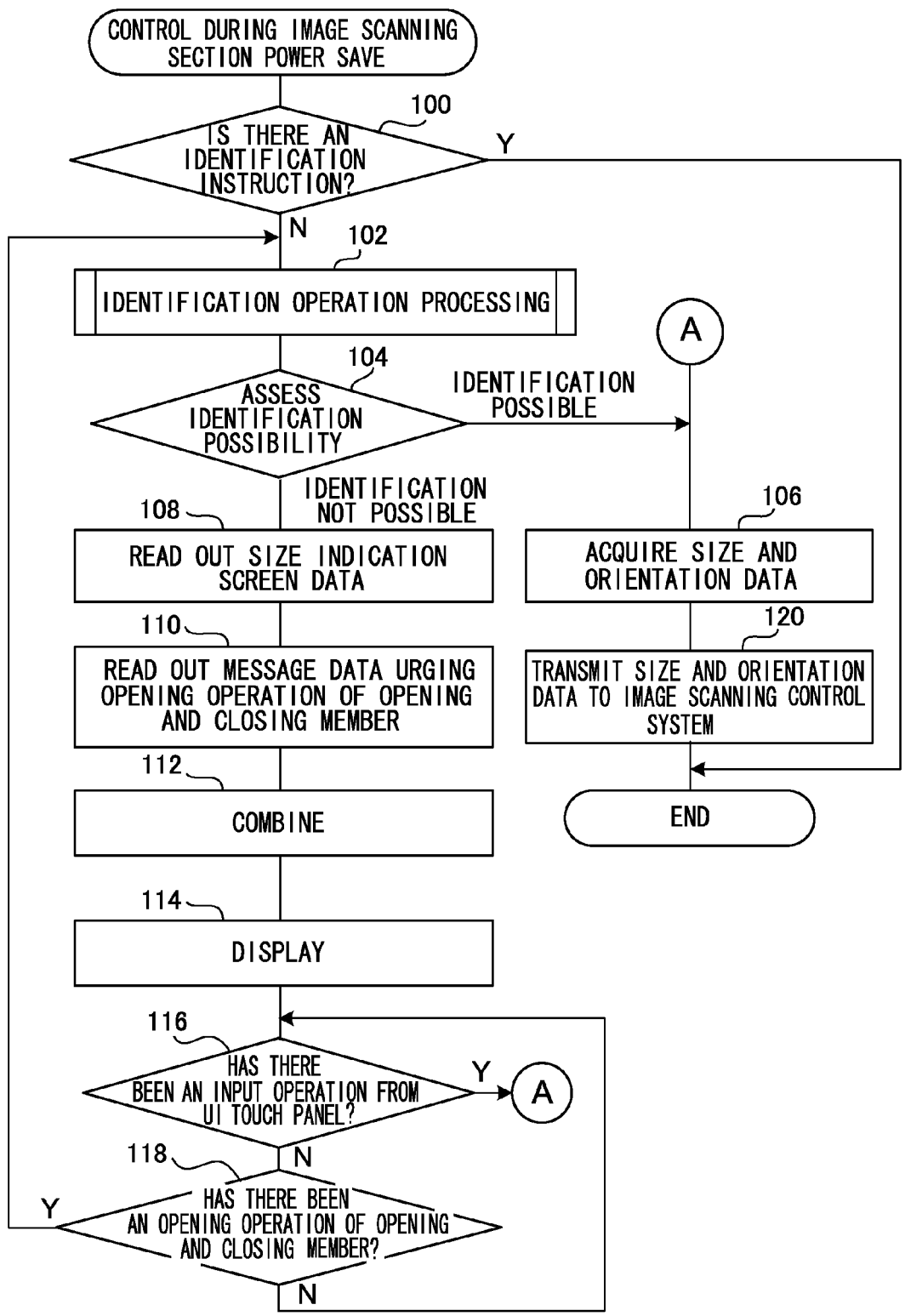
FIG. 5 is a flow chart showing control for identifying the size and orientation of an original that has been placed on an original platen of an image scanning section according to the present exemplary embodiment.

Explanation follows of operation of the present exemplary embodiment, with reference to the flow chart of FIG. 5. FIG. 5 is a control routine during image scanning section power save.

In step 100, determination is made as to whether or not there is an identification instruction accompanying triggering of reactivation from power save, when negative determination is made the routine is ended.

When affirmative determination is made at step 100, processing proceeds to step 102 and identification operation processing is executed. This identification operation processing is operation to illuminate the light source section 34 during the closing operation of the opening and closing member 24, and to detect the edges of the original with the CCD line sensor 32.

In the next step 104, identification possibility assessment is performed. Namely, determination is made as to whether or not the size and orientation of the original can be identified by the identification operation processing at step 102. When affirmative determination is made at step 104 (identification possible), processing proceeds to step 106.

When negative determination is made at step 104 (identification not possible), processing proceeds to step 108, size indication screen data is read out, then processing proceeds to step 110 and message data urging opening and closing operation of the opening and closing member 24 (such as, for example, "first open then slowly close the lid of the original platen") is read out, and processing proceeds to step 112. At step 112, data read out at the above steps 108, 110 are combined, and processing proceeds to step 114.

At step 114, the above combined data is displayed on the UI touch panel 216, then processing proceeds to step 116.

At step 116, determination is made as to whether or not there has been input operation by a user from the UI touch panel 216, when affirmative determination is made, namely, when determined there has been an input operation according to the size indication screen, processing proceeds to step 106.

When negative determination is made at step 116, processing proceeds to step 118, determination is made as to whether or not there has been opening operation of the opening and closing member 24, when negative determination is made processing returns to step 116, and steps 116 and 118 are repeated until affirmative determination is made at one or other thereof.

When affirmative determination is made at 118 (that there is opening operation of the opening and closing member 24), processing returns to step 102, and the above processes are repeated.

Size and orientation data is acquired at step 106, then processing proceeds to step 120 where the size and orientation data is transmitted to the image scanning control system of the image scanning section 238 and this routine is ended.

Modified Embodiment

In the present exemplary embodiment configuration is made such that an identification instruction is output to the size identification control section 36 of the image scanning section 238 when reactivation of the image scanning section is triggered. However, configuration may be made such that opening operation of the opening and closing member 24 is detected and reactivation operation performed. In such cases, when the original is placed on the original platen 26, control is different for the duration up to when the opening and closing member 24 is closed, and the duration up to when the reactivation operation from power save of the image scanning section 238 is complete.

Figure 6:
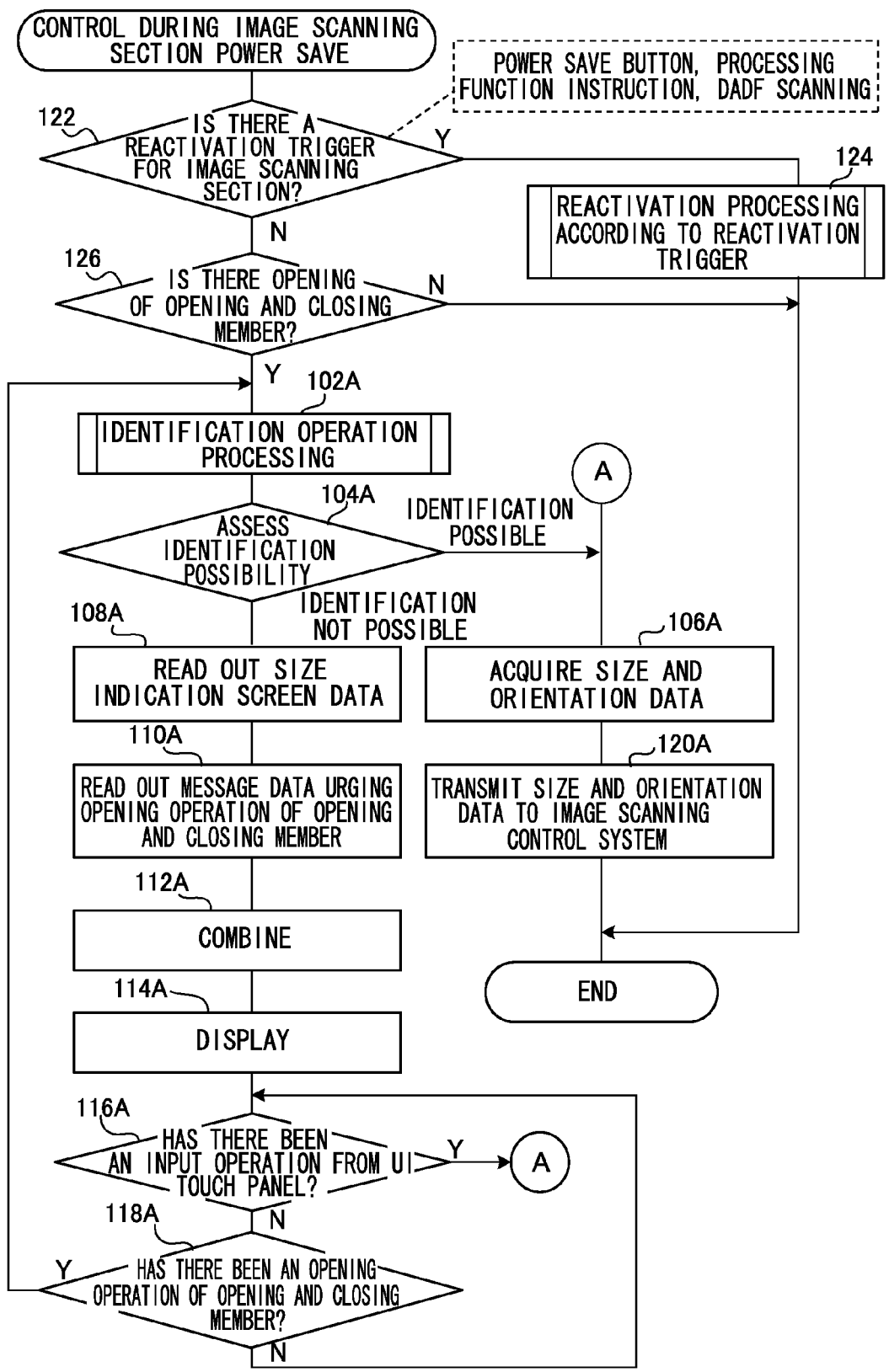
FIG. 6 is a flow chart showing control for identifying the size and orientation of an original that has been placed on an original platen of an image scanning section according to the present exemplary embodiment.

FIG. 6 is a control routine during image scanning section power save according to a modified example. Note that control steps here that are similar to those of the flow chart of FIG. 5 are allocated the same reference numerals, with a suffix "A" appended thereto.

At step 122, determination is made as to whether or not reactivation of the image scanning section 238 from power save has been triggered. Such triggering of reactivation from power save is, for example, operation of the power save button 219, processing function instruction, DADF scanning or the like. When affirmative determination is made as step 122, processing proceeds to step 124, reactivation processing is executed according to reactivation triggering, and the routine is ended.

When negative determination is made at step 122, processing proceeds to step 126, determination is made as to whether or not opening operation of the opening and closing member 24 has been performed. When negative determination is made at step 126 this routine is ended.

When affirmative determination is made at step 126, processing proceeds to step 102A, and identification operation processing is executed. This identification operation processing is operation to illuminate the light source section 34 during the closing operation of the opening and closing member 24, and to detect the edges of the original with the CCD line sensor 32.

In the next step 104A, identification possibility assessment is performed. Namely, determination is made as to whether or not the size and orientation of the original can be identified by identification operation processing at step 102A. When affirmative determination is made at step 104A (identification possible), processing proceeds to step 106A.

When negative determination is made at step 104A (identification not possible), processing proceeds to step 108A, size indication screen data is read out, then processing proceeds to step 110A and message data urging opening and closing operation of the opening and closing member 24 (such as, for example, "first open then slowly close the lid of the original platen") is read out, and transition is made to step 112A. At step 112A, data read out at the above steps 108A, 110A are combined, and processing proceeds to step 114A.

At step 114A, the above combined data is displayed on the UI touch panel 216, then processing proceeds to step 116A.

At step 116A, determination is made as to whether or not there has been input operation by a user from the UI touch panel 216, when affirmative determination is made, namely, when determination is that there has been an input operation according to the size indication screen, processing proceeds to step 106A.

When negative determination is made at step 116A, processing proceeds to step 118A, determination is made as to whether or not there has been opening operation of the opening and closing member 24, when negative determination is made processing returns to step 116A, and steps 116A and 118A are repeated until affirmative determination is made at one or other thereof.

When affirmative determination is made at 118A (that there is opening operation of the opening and closing member 24), processing returns to step 102, and the above processes are repeated.

At step 106A, size and orientation data is acquired, then processing proceeds to step 120A where the size and orientation data is transmitted to the image scanning control system of the image scanning section 238 and this routine is ended.

What is claimed is:

1. An image processing apparatus comprising:
    an image scanner that executes image processing to scan in an image of an original when there has been an image scanning instruction, the image scanner comprising an original platen on which the original is placed, an opening and closing member capable of moving between two positions that are an open position for placing an original on the original platen, and a closed position in which the original is disposed between the original platen and the opening and closing member, a closing operation detection unit that detects closing operation of the opening and closing member from the open position to the closed position, and a determination unit that determines a size and orientation of the original placed on the original platen when closing operation has been detected by the closing operation detection unit;
    an image forming unit that forms an image on recording paper based on either image data scanned by the image scanner or image data received from outside of the image scanner;
    a switching unit that independently switches between power supply or supply interruption for a plurality of respective image processors at least including the image scanner and the image forming unit;
    a notification unit that, when there has been a power save release instruction with the image scanner in a power interrupted state, after power supply has been resumed the notification unit executes notification to urge selection of either manual input of the size and the orientation of the original or opening and closing operation of the opening and closing member; and
    an image scanning processing control unit that executes image scanning processing of the image scanner at time when the size and the orientation of the original have been confirmed based on operation according to notification of the notification unit.

2. The image processing apparatus of claim 1, further comprising an opening operation detection unit that in the power interrupted state detects opening operation of the opening and closing member from the closed position to the open position, wherein:
    an instance of the power save release instruction is opening operation of the opening and closing member detected by the opening operation detection unit; and
    notification is executed by the notification unit during the period up to re-supply of power in cases where closing operation of the opening and closing member cannot be detected by the closing operation detection unit the opening and closing member being closed with the original placed on the original platen.

3. A non-transitory computer readable storage medium storing a program to cause a computer to execute power supply control in an image processing apparatus of claim 1, the power supply control comprising:
    resuming power supply when there has been the power save release instruction when the image scanner is in the power interrupted state;
    executing, after power supply has been resumed, notification urging selection of either manual input of the size and orientation of the original or opening and closing operation of the opening and closing member; and
    executing image scanning processing at the time when the size and the orientation of the original have been confirmed based on operation according to the notification.

4. A non-transitory computer readable storage medium storing a program to cause a computer to execute power supply control in an image processing apparatus of claim 2, the power supply control comprising:
    resuming power supply when there has been the power save release instruction with the image scanner in the power interrupted state;
    executing notification, after resuming power supply, to urge selection of either manual input of the size and orientation of the original or opening and closing operation of the opening and closing member; and executing image scanning processing at the time when the size and the orientation of the original have been confirmed based on operation according to the notification.

\* \* \* \* \*